US011863936B2

(12) United States Patent
Goorevich et al.

(10) Patent No.: US 11,863,936 B2
(45) **Date of Patent: *Jan. 2, 2024**

(54) HEARING PROSTHESIS PROCESSING MODES BASED ON ENVIRONMENTAL CLASSIFICATIONS

(71) Applicant: Cochlear Limited, Macquarie University (AU)

(72) Inventors: Michael Goorevich, Naremburn (AU); Kyriaky Griffin, Lane Cove (AU)

(73) Assignee: Cochlear Limited, Macquarie University (AU)

( * ) Notice: Subject to any disclaimer, the term of this patent is extended or adjusted under 35 U.S.C. 154(b) by 215 days.

This patent is subject to a terminal disclaimer.

(21) Appl. No.: 17/110,863

(22) Filed: Dec. 3, 2020

(65) Prior Publication Data

US 2021/0092535 A1 Mar. 25, 2021

Related U.S. Application Data

(63) Continuation of application No. 15/143,183, filed on Apr. 29, 2016, now abandoned, which is a (Continued)

(51) Int. Cl.
*H04R 25/00* (2006.01)

(52) U.S. Cl.
CPC ........... *H04R 25/505* (2013.01); *H04R 25/00* (2013.01); *H04R 25/405* (2013.01); *H04R 25/407* (2013.01); *H04R 25/43* (2013.01); *H04R 25/554* (2013.01); *H04R 2225/39* (2013.01); *H04R 2225/41* (2013.01); *H04R 2225/43* (2013.01); *H04R 2460/01* (2013.01)

(58) Field of Classification Search
CPC ........... H04R 2225/39; H04R 2225/41; H04R 2225/43
USPC .................................................. 381/312–314
See application file for complete search history.

(56) References Cited

U.S. PATENT DOCUMENTS 5,604,812 A 2/1997 Meyer
5,706,351 A 1/1998 Weinfurtner
(Continued)

FOREIGN PATENT DOCUMENTS

EP 2375781 B1 10/2011
EP 2381700 B1 10/2011

*Primary Examiner* — Katherine A Faley
(74) *Attorney, Agent, or Firm* — Edell, Shapiro & Finnan, LLC

(57) ABSTRACT

A method includes determining a first feature of a first audio signal at a first location in a signal processing path and determining, using the first feature, a first environmental classification of the first signal. Further, the method includes, based on the first environmental classification, enabling, modifying or disabling one or both of a first signal processing mode at the first location and a second signal processing mode at a second location in the signal processing path. The method also includes determining a second feature of a second audio signal at the second location and determining, using the second feature, a second environmental classification of the second signal. Further, the method includes, based on the second environmental classification, enabling, modifying or disabling one or both of the first signal processing mode at the first location and the second signal processing mode at the second location.

20 Claims, 8 Drawing Sheets

Related U.S. Application Data continuation of application No. 14/463,867, filed on Aug. 20, 2014, now Pat. No. 9,357,314, which is a continuation of application No. 13/650,307, filed on Oct. 12, 2012, now Pat. No. 8,824,710.

(56) References Cited

U.S. PATENT DOCUMENTS

| | | | | |
|---|---|---|---|---|
| 5,838,806 | A | 11/1998 | Sigwanz | |
| 6,047,074 | A | 4/2000 | Zoels | |
| 6,130,950 | A | 10/2000 | Martin | |
| 6,175,635 | B1 | 1/2001 | Meyer | |
| 6,763,116 | B2 | 7/2004 | Barthel | |
| 7,113,589 | B2 | 9/2006 | Mitchler | |
| 7,158,931 | B2 | 1/2007 | Allegro | |
| 7,286,678 | B1 | 10/2007 | Bachler | |
| 7,319,769 | B2 | 1/2008 | Allegro-Baumann | |
| 7,428,312 | B2 | 9/2008 | Meier | |
| 7,499,559 | B2 | 3/2009 | Wyrsch | |
| 7,599,500 | B1 | 10/2009 | Segel | |
| 7,664,280 | B2 | 2/2010 | Rass | |
| 7,738,665 | B2 | 6/2010 | Dijkstra et al. | |
| 7,957,548 | B2 | 6/2011 | Meier | |
| 2002/0037088 | A1 * | 3/2002 | Dickel | H04R 25/407 381/317 |
| 2003/0144838 | A1 | 7/2003 | Allegro | |
| 2004/0047474 | A1 * | 3/2004 | Vries | H04R 25/70 381/60 |
| 2004/0078199 | A1 | 4/2004 | Kremer | |
| 2007/0189561 | A1 * | 8/2007 | Dijkstra | H04R 25/554 381/315 |
| 2007/0269064 | A1 | 11/2007 | Allegro-Baumann | |
| 2013/0129125 | A1 | 5/2013 | Meskens | |
| 2013/0322669 | A1 | 12/2013 | Boretzki | |
| 2014/0105433 | A1 | 4/2014 | Goorevich | |

* cited by examiner

HEARING PROSTHESIS PROCESSING MODES BASED ON ENVIRONMENTAL CLASSIFICATIONS

CROSS-REFERENCE TO RELATED APPLICATIONS

This application is a continuation of U.S. application Ser. No. 15/143,183, entitled, "Automated Sound Processor," filed on Apr. 29, 2016, which is a continuation of U.S. application Ser. No. 14/463,867, entitled, "Automated Sound Processor with Audio Signal Feature Determination and Processing Mode Adjustment," filed on Aug. 20, 2014, which is a continuation of U.S. application Ser. No. 13/650,307, entitled, "Automated Sound Processor," filed on Oct. 12, 2012, the contents of which are hereby incorporated in their entirety.

BACKGROUND

Various types of hearing prostheses may provide people having different types of hearing loss with the ability to perceive sound. Hearing loss may be conductive, sensorineural, or some combination of both conductive and sensorineural hearing loss. Conductive hearing loss typically results from a dysfunction in any of the mechanisms that ordinarily conduct sound waves through the outer ear, the eardrum, or the bones of the middle ear. Sensorineural hearing loss typically results from a dysfunction in the inner ear, including the cochlea, where sound vibrations are converted into neural signals, or any other part of the ear, auditory nerve, or brain that may process the neural signals.

People with some forms of conductive hearing loss may benefit from hearing prostheses, such as acoustic hearing aids or vibration-based hearing aids. An acoustic hearing aid typically includes a small microphone to detect sound, an amplifier to amplify certain portions of the detected sound, and a small speaker to transmit the amplified sound into the person's ear. Vibration-based hearing aids typically include a small microphone to detect sound, and a vibration mechanism to apply vibrations corresponding to the detected sound to a person's bone, thereby causing vibrations in the person's inner ear, thus bypassing the person's auditory canal and middle ear. Vibration-based hearing aids include bone anchored hearing aids, direct acoustic cochlear stimulation devices, or other vibration-based devices.

A bone anchored hearing aid typically utilizes a surgically-implanted mechanism to transmit sound via direct vibrations of the skull. Similarly, a direct acoustic cochlear stimulation device typically utilizes a surgically-implanted mechanism to transmit sound via vibrations corresponding to sound waves to generate fluid motion in a person's inner ear. Other non-surgical vibration-based hearing aids may use similar vibration mechanisms to transmit sound via direct vibration of teeth or other cranial or facial bones.

Each type of hearing prosthesis has an associated sound processor. One basic sound processor provides an amplification to any sounds received by the prosthesis. However, in other example hearing prostheses, the processor present in the hearing prosthesis may be more advanced. For example, some processors are programmable and include advanced signal processing functions (e.g., noise reduction functions).

A traditional sound processing system includes a signal input, a variety of processing modules, and an output. Typically, the audio signal feeds into a linear combination of processing modules. Each processing module has a specific function to perform on the audio signal. Additionally, the recipient of the prosthesis may be able to enable at least one processing mode for the hearing prosthesis. When the recipient selects at least one processing mode, a subset of the processing modules are selectively enabled or disabled based on the chosen processing mode. Further, the selection of at least one processing mode may modify parameters associated with processing modules. Thus, in the traditional processing system, once at least one sound processing mode is selected, the prosthesis will continue creating an output based on the selected sound processing mode(s).

In the traditional processing system, an Environmental Classifier may be located at one place in the signal path, typically using a microphone signal as input. Depending on the environment detected (e.g., either Noise, Speech, Speech+Noise, Music, etc.), an algorithm and parameter control module then decides what signal processing modes of the signal path to enable or disable, what parameters to change, and does this for the whole signal path. One potential disadvantage of such a scheme is that a classification decision is made only once.

SUMMARY

As disclosed above, a traditional hearing prosthesis will receive an input signal, process the input signal, and create an output. Generally, upon receipt of the input signal, the hearing prosthesis uses a microphone to convert an acoustic wave into an electrical signal. Applying parameters associated with a sound processing mode, a sound processor of the prosthesis then transforms the electrical signal into a transformed signal, and the prosthesis produces an output based on the transformed signal.

Advantageously, in the disclosed systems and methods, the processor may work on an ongoing basis to optimize which sound processing modes are enabled in the sound processing pathway of a hearing prosthesis. The sound processor in a hearing prosthesis has a variety of sound processing modes that may be enabled, modified or disabled in order to produce a desired effect in the output of the hearing prosthesis.

In practice, in the example disclosed systems and methods, the sound processor may first classify environments from the input signal and responsively enable a first sound processing mode based on the classification of the input signal. In the various disclosed embodiments, the sound processor may operate in different modes to classify the input signal and enable sound processing modes. Further, the sound processor may cause the processor to transform the input signal into a first transformed signal based on the enabled sound processing mode. The first transformed signal may be further analyzed and further sound processing modes may be enabled to create and output signal. Once the output signal is created, the processor may either (i) communicate the output to further circuitry, or (ii) attempt to identify further classifications and responsively enable further processing modes and transformations.

In one example, the signal processor transforms the input signal into the transformed signal by determining a first feature of the first signal and responsively enabling a first signal processing mode based on the determined first feature. Additionally, the sound processor will determine a second feature of the intermediate signal and responsively enable a second signal processing mode based on the determined second feature. The second signal processing mode is configured to transform the intermediate signal into a second signal. The second signal may be used as the output signal.

In some examples, the first signal processing mode and the second signal processing mode are chosen from a group of available processing modes. In additional embodiments, the processor is further operable to determine a third feature of the second signal and enable a third signal processing mode based on the determined third feature. The third signal processing mode is configured to transform the second signal into the third signal. The third signal may be used as the output signal. Embodiments also include iteratively identifying multiple signal features and enabling multiple signal processing modes (not limited to the three classifications as described previously).

In additional examples, a single classifier unit determines features and enables the signal processing modes. In other examples, or multiple classifier units determine features and enable signal processing modes. Additionally, in some embodiments, the second feature may not be determined until after the first signal processing mode is enabled.

In one example, noise features are first identified and a noise-reduction mode is enabled. Next, either voice or music features are identified. Responsively, either a voice-enhancement mode or a music mode is enabled. In some instances, it may not be possible to identify the voice or music features until the noise-reduction mode has been enabled. In some further embodiments, a signal outside the audio pathway may be classified and used to enable a processing mode within the audio pathway. For example, a mixing ratio may be enabled by a feature in the signal outside the audio pathway. The mixing ratio may be used to adjust the mixing level of at least two input signals representing audio signals.

DETAILED DESCRIPTION

Figure 1A:
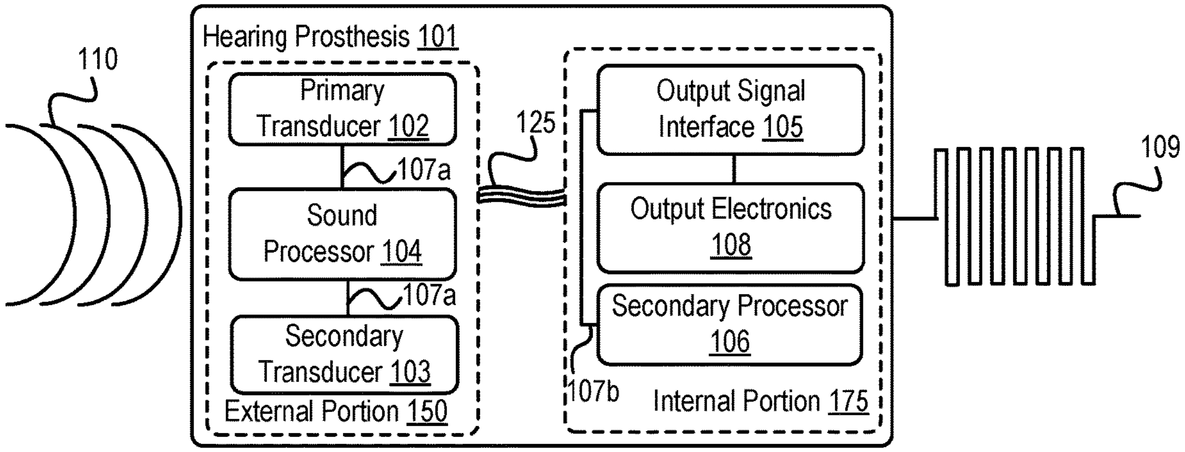
FIG. 1A shows an example of a hearing prosthesis.

For illustration purposes, some systems and methods are described with respect to cochlear implants. However, many systems and methods may be equally applicable to other types of hearing prostheses. Certain aspects of the disclosed systems and methods could be applicable to any type of hearing prosthesis now known or later developed. Further, some of the disclosed methods can be applied to other acoustic devices that are not necessarily hearing prostheses. FIG. 1A shows one example of a hearing prosthesis 101 configured according to some embodiments of the disclosed systems and methods. The hearing prosthesis 101 may be a cochlear implant, an acoustic hearing aid, a bone anchored hearing aid or other vibration-based hearing prosthesis, a direct acoustic stimulation device, an auditory brain stem implant, or any other type of hearing prosthesis configured to receive and process at least one signal from an audio transducer of the prosthesis.

The hearing prosthesis 101 includes an external portion 150 and an internal portion 175. The external portion 150 includes a primary transducer 102, a secondary transducer 103, and a sound processor 104, all of which are connected directly or indirectly via circuitry 107*a*. The internal portion 175 includes an output signal interface 105, output electronics 108, and a secondary processor 106, all of which connect directly or indirectly via circuitry 107*b*. In other embodiments, the hearing prosthesis 101 may have additional or fewer components than the prosthesis shown in FIG. 1A. For example, secondary transducer 103 is omitted in some embodiments. Additionally, the components may be arranged differently than shown in FIG. 1A. For example, depending on the type and design of the hearing prosthesis, the illustrated components may be enclosed within a single operational unit or distributed across multiple operational units (e.g., an external unit and an internal unit). Similarly, in some embodiments, the hearing prosthesis 101 additionally includes one or more processors (not shown) configured to determine various settings for either sound processor 104 or secondary processor 106.

In embodiments where the hearing prosthesis 101 is a cochlear implant, the hearing prosthesis comprises an external portion 150 worn outside the body and an internal portion 175 located or implanted within the body. The external portion 150 is coupled to the internal portion 175 via an inductive coupling pathway 125. The primary transducer 102 receives acoustic signals 110, and the sound processor 104 analyzes and encodes the acoustic signals 110 into a group of electrical stimulation signals 109 for application to an implant recipient's cochlea via an output signal interface 105 communicatively connected to output electronics 108.

In some embodiments, some or all of the sound processor 104 circuitry is located in another separate external portion (not shown). For example, the sound processor 104 may be located in a standard computer, a laptop computer, a tablet computing device, a mobile device such as a cellular phone, or a remote control or other custom computing device. The primary transducer 102 may wirelessly communicate signals to the sound processor 104. Further, the external portion 150 may also include a secondary transducer 103. The secondary transducer 103 may be the same type of transducer as the primary transducer 102. However, in some embodiments, the secondary transducer 103 is a different type of transducer than the primary transducer 102. For example, both transducers are microphones; however, each may have a different beam pattern.

For a cochlear implant, the output electronics 108 are an array of electrodes. Individual sets of electrodes in the array of electrodes are grouped into stimulation channels. Each stimulation channel has at least one working electrode (current source) and at least one reference electrode (current sink). During the operation of the prosthesis, the cochlear implant applies electrical stimulation signals to a recipient's cochlea via the stimulation channels. It is these stimulation signals that cause the recipient to experience sound sensations corresponding to the sound waves received by the primary transducer 102 and encoded by the processor 104.

Figure 1B:
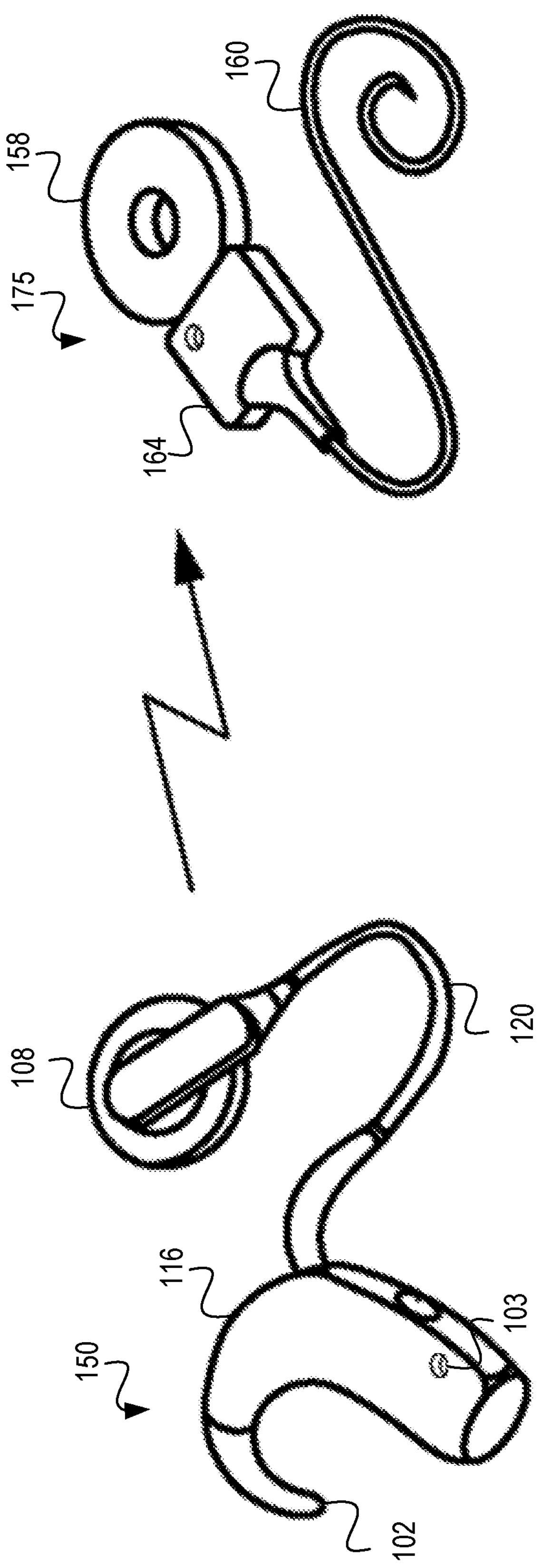
FIG. 1B shows an example of an external portion of a cochlear implant coupled to the internal portion of the cochlear implant.

FIG. 1B shows an example of an external portion 150 of a cochlear implant communicatively coupled to the internal portion 175 of the cochlear implant. The external portion 150 is directly attached to the body of a recipient and the internal portion 175 is implanted in the recipient. The external portion 150 typically comprises a housing 116, that includes a primary transducer 102 for detecting sound, a sound processing unit (104 of FIG. 1A), an external coil 108 including a radio frequency modulator (not shown) and a coil driver (not shown), and a power source (not shown). External coil 108 is connected to a transmitter unit (not shown) and the housing 116 by a wire 120. The housing 116 typically is shaped so that it can be worn and held behind the ear. In some embodiments, the external portion 150 may also include a secondary transducer 103. The sound processing unit in the housing 116 processes the output of the transducer 102 and generates coded signals that are provided to the external coil 108 via the modulator and the coil driver.

The internal portion 175 comprises a housing 164. Located within housing 164 are a receiver unit (not shown), a stimulator unit (not shown), an external portion sensor (not shown), a power source (not shown), and a secondary processor (106 of FIG. 1A). Attached to the housing 164 are an internal coil 158 and an electrode assembly 160 that can be inserted in the cochlea. Magnets (not shown) may be secured to the internal (receiving) coil 158 and the external (transmitting) coil 108 so that the external coil 108 can be positioned and secured via the magnets outside the recipient's head aligned with the implanted internal coil 158 inside the recipient's head. The internal coil 158 receives power and data from the external coil 108.

The internal portion 175 has a power source, such as a battery or capacitor, to provide energy to the electronic components housed within the internal portion 175. In some embodiments, the external portion 150 is able to inductively charge the power source within the internal portion 175. In an example embodiment, a power source that is part of the external portion 150 is the primary power source for the hearing prosthesis. In this example, the power source within the internal portion 175 is only used as a backup source of power. The battery in the internal portion 175 is used as a backup power source when either the external portion 150 runs out of power or when the external portion 150 is decoupled from the internal portion 175. The electrode assembly 160 includes a cable that extends from the implanted housing 164 to the cochlea and terminates in the array of electrodes. Transmitted signals received from the internal coil 158 are processed by the receiver unit in the housing 164 and are provided to the stimulator unit in the housing 164.

The external coil 108 is typically held in place and aligned with the implanted internal coil via the noted magnets. In one embodiment, the external coil 108 is configured to transmit electrical signals to the internal coil via a radio frequency (RF) link. In some embodiments, the external coil 108 is also configured to transmit electrical signals to the internal coil via a magnetic (or inductive) coupling.

Figure 2:
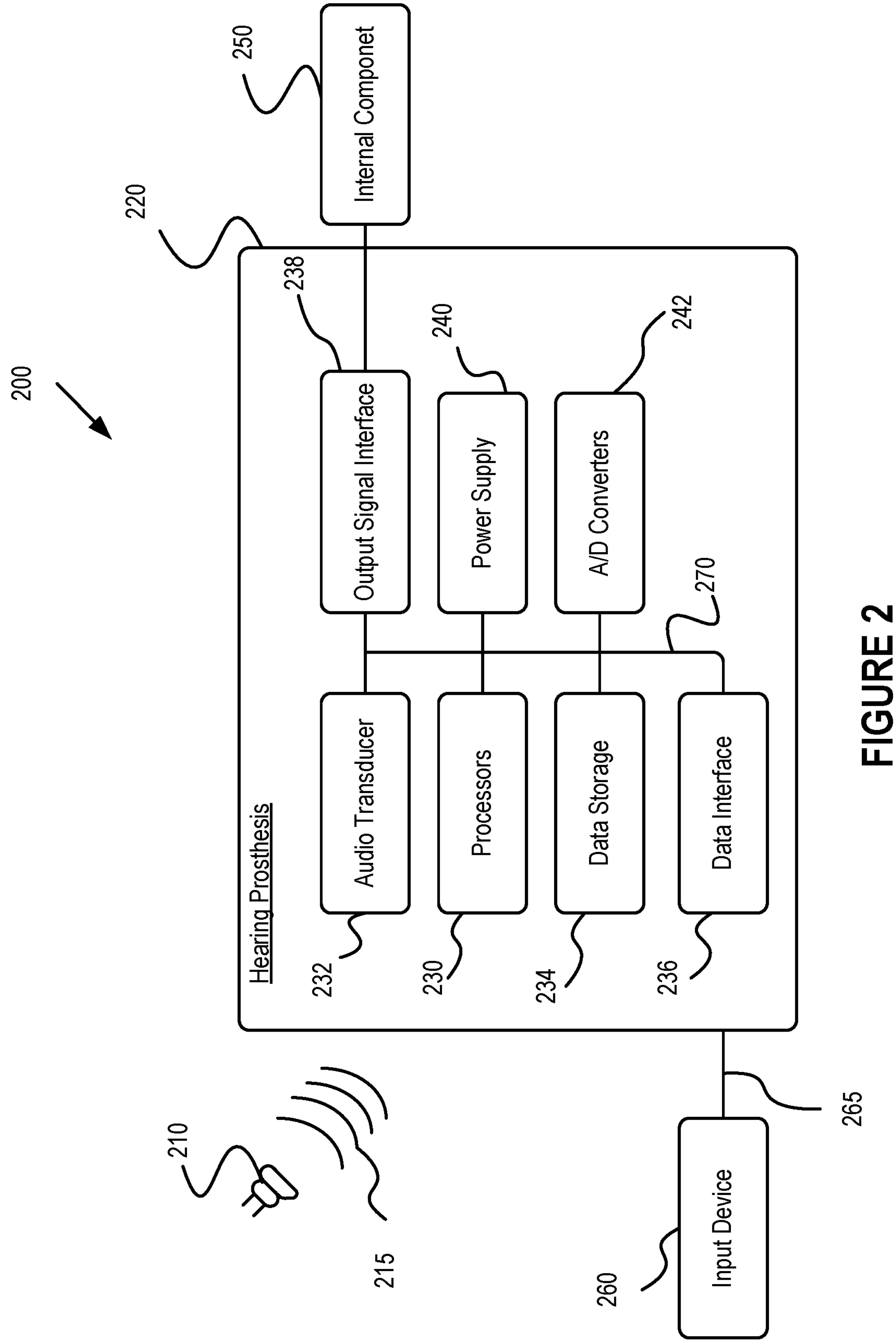
FIG. 2 is an example block diagram of a system that includes a hearing prosthesis configured according to some embodiments of the disclosed methods.

FIG. 2 shows one example system 200 that includes a hearing prosthesis 220 configured according to some embodiments of the disclosed methods, systems, and hearing prostheses. In an exemplary embodiment, the hearing prosthesis 220 is a cochlear implant. In other embodiments, the hearing prosthesis 220 is a bone-anchored device, a direct acoustic stimulation device, an auditory-brain-stem implant, an acoustic hearing aid, or any other type of hearing prosthesis configured to assist a prosthesis recipient in perceiving sound.

The hearing prosthesis 220 illustrated in FIG. 2 includes a data interface 236, at least one audio transducer 232, one or more processors 230, an output signal interface 238, data storage 234, at least one analog-to-digital converter 242, and a power supply 240, all of which are illustrated as being connected directly or indirectly via a system bus or other circuitry 270. Further, the one or more processors 230 may be located within the hearing prosthesis 220 and/or located in an external computing device.

The power supply 240 supplies power to various components of the hearing prosthesis 220 and can be any suitable power supply, such as a non-rechargeable or rechargeable battery. In one example, the power supply 240 is a battery that can be recharged wirelessly, such as through inductive charging. Such a wirelessly rechargeable battery would facilitate complete subcutaneous implantation of the hearing prosthesis 220 to provide a fully implantable prosthesis. A fully implanted hearing prosthesis has the added benefit of enabling the recipient to engage in activities that expose the recipient to water or high atmospheric moisture, such as swimming, showering, etc., without the need to remove, disable or protect, such as with a water/moisture proof covering or shield, the hearing prosthesis.

The data storage 234 generally includes any suitable volatile and/or non-volatile storage components. Further, the data storage 234 includes computer-readable program instructions and perhaps additional data. In some embodiments, the data storage 234 stores an amplitude response, a phase response, and recipient-specific parameters associated with the hearing prosthesis 220. Additionally, the data storage 234 stores a set of signal processing modes and associated parameters for each respective signal processing mode. In other embodiments, the data storage 234 also includes instructions used to perform at least part of the disclosed methods and algorithms, such as method 700 described with respect to FIG. 7. Further, the data storage 234 may be configured with instructions that cause the processor 230 to execute functions relating to any of the modules disclosed herein.

In other embodiments, the analog-to-digital converter 242 receives the input signal from the audio transducer 232 via the system bus or other known circuitry 270. In such embodiments, the processors 230 include a digital signal processor or similar processor suitable for processing digital audio signals.

In the illustrated example, the audio transducer 232 is an omnidirectional microphone. In alternative embodiments, the audio transducer 232 is one or more directional microphone(s), omnidirectional microphone(s), electro-mechanical transducer(s), and/or any other audio transducer(s) or combination of audio transducers suitable for receiving audio signals for the hearing prosthesis utilized. The audio transducer 232 receives, for example, an audio signal 215 from an audio source 210 and supplies input signal to the processor 230.

In the present example, the processor 230 is configured to operate in a plurality of sound processing modes. A subset of example sound processing modes includes noise reduction, gain control, loudness mapping, wind-noise reduction mode, beam-forming mode, voice enhancement mode, feedback reduction mode, compression timing mode, and music mode. In some circumstances, the audio transducer 232 also receives wind noise and/or other noise, as a component of the input signal. To remove the wind noise, one method for example is to subtract a signal representing wind noise from the input signal. However, other methods may be used to remove the wind noise from the input signal.

The processor 230 receives the input signal and analyzes the signal to determine at least one sound processing mode to apply to the signal. The processor 230 uses features of the input signal to determine an appropriate sound processing mode. Once a sound processing mode is determined, the sound processing mode is applied to the input signal with the processor 230 to create a first transformed signal. The processor 230 further analyzes the first transformed signal to determine any further processing modes to apply to the first transformed signal. The processor 230 is able to identify a desirable second sound processing mode that would have gone unnoticed if the first signal processing mode had not been applied.

For example, the processor 230 may identify wind noise as a component of the input signal and responsively enable a wind-noise reduction mode. Further, once a first sound processing mode is enabled, the processor 230 transforms the input signal into a first transformed signal and analyzes the first transformed signal to determine additional sound processing modes to enable. For example, after the wind-noise reduction mode is enabled, the processor 230 may enable a voice enhancement mode. The processor 230 creates an output based on the application of both sound processing modes. Further, the processor 230 may transform the input signal into the output using methods similar to method 700 described with respect to FIG. 7.

In some situations, the sound processor is located in a remote computing device and processes a portion of the signal. In such cases, data is transmitted via an input/output device 260. The input/output device 260 is, for example, a remote computer terminal suitable for issuing instructions to the processor. The input/output device 260 transmits the request to the data interface 236 via a communication connection 265. The communication connection 265 may be any suitable wired connection, such as an Ethernet cable, a Universal Serial Bus connection, a twisted pair wire, a coaxial cable, a fiber-optic link, or a similar physical connection, or any suitable wireless connection, such as Bluetooth, Wi-Fi, WiMAX, and the like.

The data interface 236 transmits data to the processor 230. The data transmitted may include both received audio signals and an indication of a signal processing mode. Upon receiving the data, the processor 230 performs a plurality of sound processing modes. In some embodiments, the processor 230 continues to process the data in this manner until the recipient transmits a request via the input/output device 260 to return to a normal (or default) signal processing mode.

Various modifications can be made to the hearing prosthesis 220 illustrated in FIG. 2. For example, the hearing prosthesis 220 may include additional or fewer components arranged in any suitable manner. In some examples, the hearing prosthesis 220 includes other components to process external audio signals, such as components that measure vibration in the skull caused by audio signals and/or components that measure electrical output of portions of a person's hearing system in response to audio signals. Further, depending on the type and design of the hearing prosthesis 220, the illustrated components may be enclosed within a single operational unit or distributed across multiple operational units (e.g., two or more internal units or an external unit and an internal unit).

Figure 3:
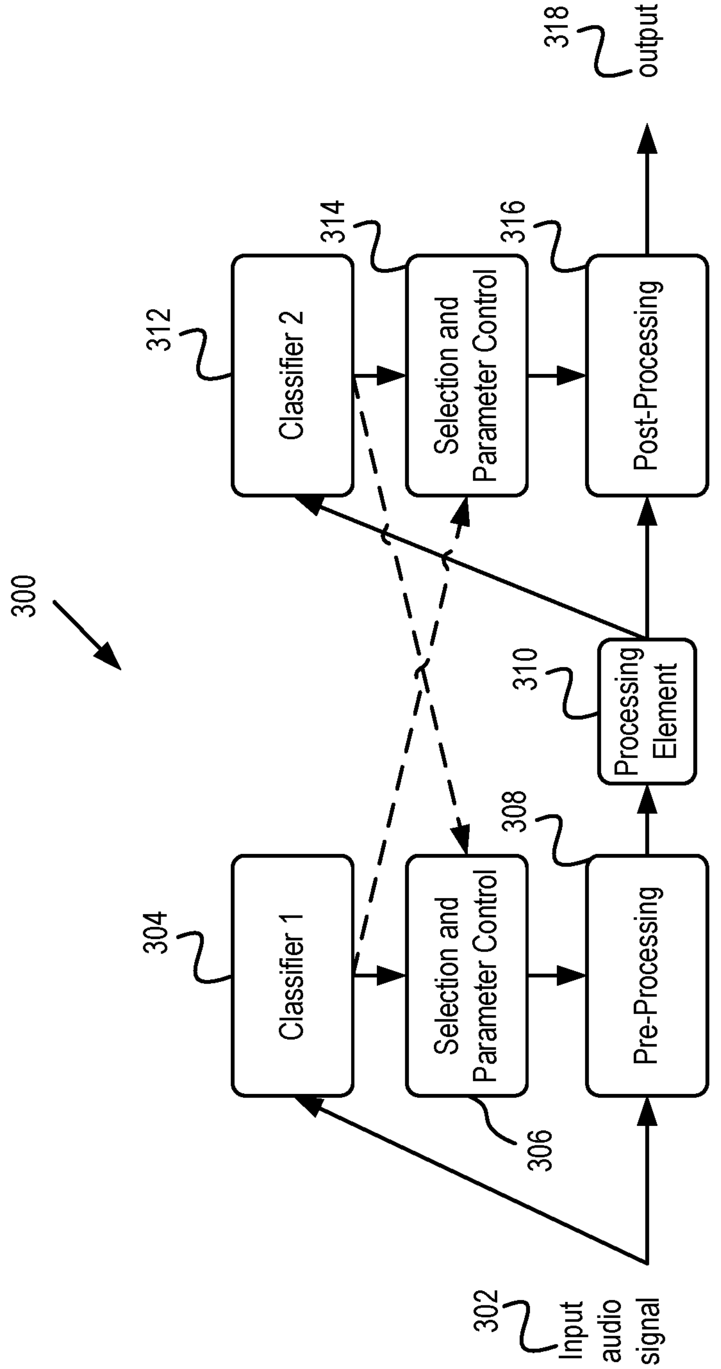
FIG. 3 is an example block diagram of a two-stage method for use with a sound processor.

FIG. 3 is a block diagram of a two-stage method 300 for use with a sound processor (such as processor 104 of FIG. 1A or processor 230 of FIG. 2). As part of method 300, the sound processor 104 receives an input audio signal 302 and transforms it into an output 318. The method 300 contains two stages, the first stage includes a first classifier 304, a first selection and parameter control 306, and pre-processing 308, while the second stage includes a second classifier 312, a second selection and parameter control 314, and post-processing 316. In between the two stages, the method 300 has a processing element 310. The arrangement of the blocks in FIG. 3 is one example layout. In different embodiments, some blocks are combined, added, or omitted. For example, method 300 may be expanded to include more than two stages.

The method 300 distributes some sensing and control functions throughout the signal path. Thus, the input audio signal 302 is analyzed more than once to determine what signal processing functions should be enabled. For example, if noise were detected at the microphone inputs, a beam-forming mode could be enabled. Selecting a beam could result in clearer signal after the first pre-processing stage 308. This clearer signal can then be further analyzed, to determine which type of signal is now present. For example, the analysis of the clearer signal may indicate that the signal represents speech, or perhaps music. Depending on this result, the sound processor 104 may enable a speech enhancement algorithm, or a music enhancement algorithm, as appropriate. Thus, by analyzing the input audio signal 302 more than once, an increased knowledge of the signal can be obtained. Based on this increased knowledge, additional signal processing modes may be enabled.

Method 300 may use environmental sound classification to determine which processing mode to enable. In one embodiment, environment classification may include four steps. A first step of environmental classification may include feature extraction. In the feature extraction step, a sound processor may analyze an audio signal to determine features of the audio signal. For example, to determine features of the audio signal, the sound processor may measure the level of the audio signal, the modulation depth of the audio signal, the rhythmicity of the audio signal, the spectral spread of the audio signal, the frequency components of the audio signal, and other signal features.

Next, based on the measured features of the audio signal, the sound processor will perform scene classification. In the scene classification step, the sound processor will determine a sound environment (or "scene") probability based on the features of the audio signal. Some example environments are speech, noise, speech and noise, and music. Once the environment probabilities have been determined, the sound processor may perform some post processing and/or smoothing. Post processing and/or smoothing of the environment probabilities may be required, in order to provide a desired transition or other characteristic between the environment probabilities, before further processing is allowed. In one example, the system may transition between detected environments no quicker than every 30 seconds. In another example, the system may enhance or otherwise modify the probability of certain environments with respect to other environments.

Finally, the sound processor may select a sound processing mode based on post processing and/or smoothing of the scene classification. For example, if the resulting detected sound scene is classified as music, a music-specific sound processing mode may be enabled. The selected sound processing mode can be applied to one or more audio signals.

More specifically, the first classifier 304 analyzes the input audio signal 302. In some embodiments, the first classifier 304 is a specially designed processor (such as processor 104 of FIG. 1A or processor 230 of FIG. 2). Further, at the first classifier 304, the processor 104 detects features from the input audio signal 302 of the system (for example amplitude modulation, spectral spread). Upon detecting features, the sound processor responsively uses these features to classify the sound environment (for example into speech, noise, music). The sound processor makes a classification of the type of signal present based on features associated with the audio signal. In some embodiments, other signal processing techniques other than environmental classification may be used as the first classifier 304 (or the second classifier 312). For example, wind noise may be identified based on a frequency analysis of the input audio signal 302. Where environmental classification is mentioned in this disclosure, other signal processing techniques may be used as well.

At block 306, the processor 104 in the hearing prosthesis 101 performs selection and parameter control based on the classification from the first classifier 304. The sound processor 104 selects one or more processing modes. Further, the sound processor 104 also controls parameters associated with the processing mode. For example, if at block 304, the sound processor detects noise, it may also decide that the noise-reduction mode should be enabled, and/or the gain of the hearing prosthesis 101 should be reduced appropriately. Further, the processing mode selected at block 306 may be applied to the input audio signal 302 at block 308.

The data determined at step 306 may take many forms depending on the specific embodiment. For example, the data may indicate a processing mode in which the processor should operate or the data may indicate parameters associated with a specific processing function. In another example embodiment, the data is a set of parameters by which to transform the input audio signal 302. In yet another embodiment, the data is a mathematical formula that can be used by the processor to transform the input audio signal 302.

At block 308, the processor 104 receives both (i) input audio signal 302 and (ii) data determined at block 306, and the processor responsively performs a pre-processing function. The processor 104 transforms the input audio signal 302 into a transformed signal based on the data determined at block 306. For example, at block 308, the processor 104 in the hearing prosthesis 101 may have a set of one or more processing modes that it uses to transform the input audio signal 302. Based on the classification of the input audio signal 302 by the first classifier 304 module, the selection and parameter control module 306 indicates at least one sound processing mode for the processor 104 to use at block 308.

After the processor 104 transforms the signal at block 308, the processor may further filter the signal at block 310. The processing element 310 causes the processor 104 to apply further filtering and signal processing to the transformed signal. In some embodiments, the hearing prosthesis 101 is programmed with parameters specific to a given prosthesis recipient. For example, recipient-specific parameters include acoustic gain tables, frequency response curves, and other audio parameters. In some embodiments, the processing element 310 causes the processor 104 to adjust audio parameters based on a hearing impairment associated with the prosthesis recipient.

Following the processing element 310 function, the audio signal is analyzed by a second classifier 312. Similar to the first classifier 304, the second classifier 312 is performed by an audio processor (such as processor 104 of FIG. 1A or processor 230 of FIG. 2). As with the first classifier 304, at the second classifier 312 the sound processor 104 detects features from an audio signal of the system (for example amplitude modulation, spectral spread). However, the second classifier 312 detects features from the audio signal output from processing element 310 rather than from the input audio signal 302. Upon detecting features, the sound processor responsively uses these features to classify the sound environment (for example into speech, noise, music).

In some embodiments, the second classifier 312 detects a different set of features than the first classifier 304. The signal processing applied at blocks 308 and 310 transforms the signal so that previously undetectable features can be detected. For example, the second classifier 312 may detect the signal from the processing element 310 contains music. The first classifier 304 may have not been able to detect the music due to noise in the system and step 308 may have included a noise-reduction function. Thus, by classifying the signal at more than a single point in the audio pathway, more some previously undetectable features may be detected.

At block 314, the processor in the hearing prosthesis performs selection and parameter control based on the classification from the second classifier 312. Similar to block 306 as discussed previously, at block 314 the sound processor 104 selects one or more processing modes based on the determination made by the second classifier 312. Further, the sound processor 104 also controls parameters associated with this second selected processing mode. For example, if at block 312, the sound processor detects music, it may also decide that the music mode should be enabled, and/or other parameters of the system should be adjusted appropriately. Further, the processing mode selected at block 314 may be applied at block 316 to the signal output by the processing element 310. The data determined at block 314 may take many forms depending on the specific embodiment. For example, the data may indicate a processing mode in which the processor should operate or the data may indicate parameters associated with a specific processing function. In the example, at block 314, the processor 104 in the hearing prosthesis has a set of one or more processing modes that it may use to transform the signal output by the processing element 310.

At block 316, the processor 104 receives both (i) the signal output by the processing element 310 and (ii) data determined at block 314 and the processor responsively performs a post-processing function. The processor 104 transforms the signal into an output 318 based on the data determined at block 314. Based the classification of the signal by the second classifier 312 module, the selection and parameter control module 314 indicates at least one sound processing mode for the processor to use at block 316.

After post-processing at block 316 is completed, the processor 104 creates an output 318. The output can take many different forms, possibly dependent on the specific type of hearing prosthesis 101 implementing method 300. In one aspect, where the hearing prosthesis 101 is an acoustic hearing aid, the audio output will be an acoustic signal. Thus, the output 318 is an electronic signal provided to a speaker to create the audio output. In another embodiment, where the hearing prosthesis 101 is a cochlear implant, the output 318 of the hearing prosthesis 101 is a current supplied by an electrode (such as electrode assembly 160 of FIG. 1B). Thus, the output from 318 may be an electrical signal provided to the output electronics that control the electrode assembly. Additionally, the output may be supplied to further electrical components.

In some further embodiments, each stage in method 300 may share communication with the other stages. An example of this communication is shown with the dotted lines of FIG. 3. For example, the processor 104 in the hearing prosthesis 101 performs selection and parameter control based on the classification from the first classifier 304 as well as the classification provided by the second classifier 312. Thus, in some embodiments, both classifiers may determine the parameter control and selection. The shown communication is only one example of the communication between stages.

In other embodiments, each element of the first stage may communicate with its respective element pair in the second (and later) stage. In still further embodiments, at least one element of one stage may communicate with at least one or more elements of any other stages in method 300.

Figure 4:
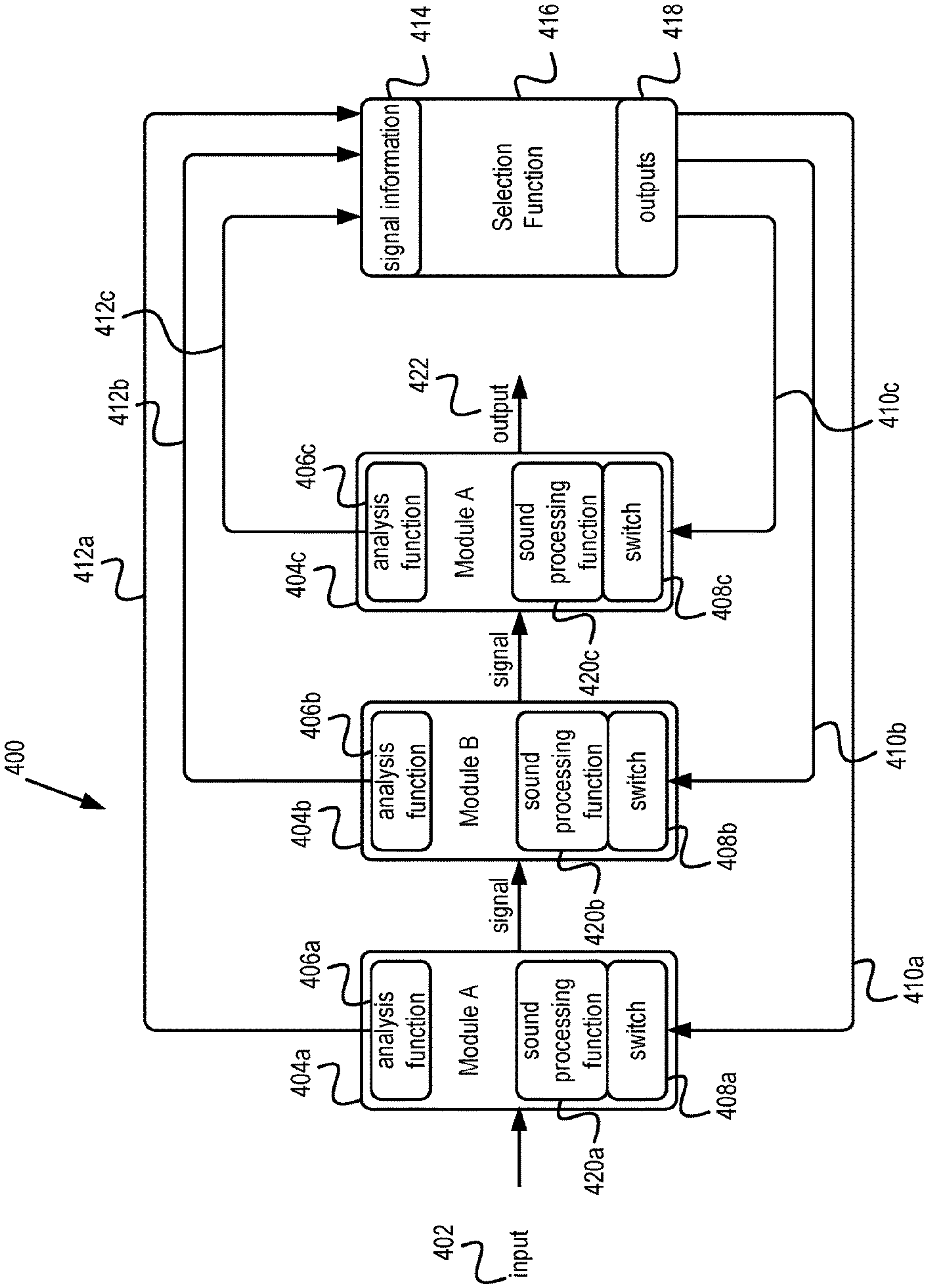
FIG. 4 is an example block diagram of a sound processor with a single selection and parameter control.

FIG. 4 is an example block diagram of a sound processor 400 with a single selection and parameter control. The sound processor 400 receives an input 402 and transforms it into an output 422. The sound processor 400 contains a plurality of modules 404*a*-404*c*. Each module 404*a*-404*c* is configured with an analysis function 406*a*-406*c* and a selection and parameter control 408*a*-408*c*. In some embodiments, selection and parameter control 408*a*-408*c* may be a switch to enable, modify or disable a given module. Further, each module 404*a*-404*c* is configured with its own specific sound processing function 420*a*-420*c*. For example, one module may a wind-noise reduction module, another module may be an automatic sensitivity control (ASC) module, and so on.

Additionally, the sound processor 400 contains a select function 416. In one embodiment, the select function 416 is configured with a signal information unit 414 and with an output unit 418. The various modules of FIG. 4 may perform functions similar to those of the first and second classifiers 304 and 312, selection and parameter control 306 (and 314) and either pre-processing 308 or post-processing 316 (of FIG. 3).

The analysis function 406*a*-406*c* of each module 404*a*-404*c* provides a signal 412*a*-412*c* to the signal information unit 414 of the selection function 416. Additionally, the output unit 418 of the select function 416 provides a signal 410*a*-410*c* to each of the selection and parameter controls 408*a*-408*c* of each of the modules 404*a*-404*c*. In one embodiment, the signal 410*a*-410*c* to each of the selection and parameter controls 408*a*-408*c* is an indication for the switch to toggle states to either enabled or disabled. In another embodiment, the signal 410*a*-410*c* to each of the selection and parameter controls 408*a*-408*c* is both a toggle as well as a parameter control for the respective module.

In different embodiments, some blocks are be combined, added, or omitted. For example, sound processor 400 is shown with three modules 404*a*-404*c*, however, in some embodiments more or fewer modules may be used. Additionally, not every module may contain both an analysis function as well as a switch. The block diagram shown in FIG. 4 is one example layout. Additionally, in some embodiments, sound processor 400 may operate in a single calculation mode. For example, sound processor 400 may enable or disable all modules present in sound processor 400 when a signal is first analyzed. However, in another embodiment, sound processor 400 may continuously (or iteratively) enable or disable modules as the input signal changes.

When one of the modules 404*a*-404*c* receives an input signal, the analysis function 406*a*-406*c* within the module determines features of the input signal based on the function of the specific module. In one example, the analysis function 406*a*-406*c* of each module extracts features from the audio inputs of the hearing prosthesis (for example amplitude modulation, spectral spread), and the select function 416 uses these features to “classify” the sound environment (for example, speech, noise, music) similar to the environmental sound classification described with respect to FIG. 3. Additionally, in some embodiments, other signal processing techniques—not necessarily environmental sound classification—may be used to identify features of the audio input.

For example, a wind-noise reduction module extracts features of the input signal that indicate the presence of wind noise. The analysis function 406*a*-406*c* then responsively determines if the extracted features indicate the presence of a windy environment. Further, the analysis function 406*a*-406*c* provides information 412*a*-412*c* from the modules 404*a*-404*c* to the signal information unit 414 based on the determined environment. In some alternative embodiments, the analysis function 406*a*-406*c* provides information 412*a*-412*c* from the modules 404*a*-404*c* to the signal information unit 414 based on the determined features of the input signal.

Additionally, each module 404*a*-404*c* has an associated signal processing function 420*a*-420*c*. Each signal processing function 420*a*-420*c* transforms a first signal into a second signal based on modifying at least one feature of the first signal to create the second signal. In turn, the features are modified based on signal processing parameters associated with the signal processing function for the respective module. For example, the features of the audio signal may be modified by a signal processing function may include acoustic gain tables, frequency response curves, and other functions designed to modify audio features. Further, each module 404*a*-404*c* is enabled, modified or disabled based on the selection and parameter controls 408*a*-408*c* associated with the respective module. When a module 404*a*-404*c* is disabled, the output signal from the module is a signal that is substantially similar to the input to the module. However, the analysis function may still operate when a given module is disabled.

When the selection function 416 receives signal information 412*a*-412*c* from each module 404*a*-404*c* with the signal information unit, the selection function 416 determines which modules should be enabled. The selection function 416 analyzes the information 412*a*-412*c* from the modules 404*a*-404*c* to determine which module(s) should be enabled. The selection function 416 makes the determination of what modules to enable based on signal information 412*a*-412*c* as well as the function associated with each module. Further, the selection function 416 may continuously determine which module(s) should be enabled. In another embodiment, the hearing prosthesis determine which module(s) should be enabled at specific time intervals. In a further embodiment, the hearing prosthesis determine which module(s) should be enabled when the ambient audio conditions change. For example, the hearing prosthesis may detect a change in the ambient audio conditions, such as the change in ambient audio conditions when a prosthesis recipient walks into a noisy room, and responsively determine which module(s) should be enabled to help to optimize sound quality.

After determining the recommended status for each module 404*a*-404*c* (i.e., whether each is enabled or disable), the selection function 416 the output unit 418 of the select function 416 will provide a signal 410*a*-410*c* to each of the selection and parameter controls 408*a*-408*c* of each of the modules 404*a*-404*c*. The signal provided to each selection and parameter control 408*a*-408*c* indicates whether each respective module 404*a*-404*c* should be enabled or disabled.

When a module it toggled from one state to another (e.g., switched from disabled to enabled), the signal processing functions applied to the signal by the respective module will change. Because the signal processing function will change responsive to a switching of at least one of the modules, the respective output of each analysis function 406*a*-406*c* responsively changes based on the change in signal processing applied to the input signal 402. Thus, a switch in one of the modules may cause a propagation through the system that results in other modules being toggled too.

In one example, Module A 404*a* may be a noise reduction module, Module B 404*b* may be an ASC module, and Module C 404*c* may be a voice enhancing module. In this example, all modules are initially disabled. However, in other embodiments, the modules 404*a*-404*c* may initially be either enabled or disabled. When an input signal 402 is received, the signal first goes to Module A 404*a*. At Module A 404*a*, the associated analysis function 406*a* determines features of the input signal 402 related to noise. Here, the analysis function 406*a* determines the features indicate a high level of noise as a part of input signal 402 and returns information 412*a* indicating the high noise level to the signal information unit 414. Because Module A 404*a* is initially disabled, the Module A 404*a* outputs Module B 404*b* a signal substantially similar to the input signal 402.

At Module B 404*b*, the associated analysis function 406*b* determines features of the input signal 402 related to the ASC function. In this example, the analysis function 406*b* may not be able to determine the noise floor of the signal due to the high noise level, thus the analysis function 406*b* returns information 412*b* indicating the analysis function 406*b* determined no relevant features to the signal information unit 414. Because Module B 404*b* is disabled, Module B 404*b* outputs Module C 404*c* a signal substantially similar to the input signal 402.

At Module C 404*c*, the associated analysis function 406*c* determines features of the input signal 402 related to the voice enhancement function. In this example, the analysis function 406*c* may not be able to determine any relevant features of the signal due to the high noise level, thus analysis function 406*c* returns information 412*c* indicating the analysis function 406*c* determined no relevant features to the signal information unit 414. Because Module C 404*c* is disabled, Module C 404*c* outputs a signal substantially similar to the input signal 402.

Based on the information 412*a*-412*c* received with the signal information unit 414, the select function 416 determines that the hearing prosthesis is operating in a noisy environment. Thus, the select function 416 indicates to the output unit 418 to send a signal 410*a* to the selection and parameter control 408*a* in Module A 404*a*. The signal 410*a* causes the module to switch to an enabled mode. When Module A 404*a* is enabled, it will perform a noise reduction algorithm on the input signal 402. Thus, after Module A 404*a* is enabled, it produces an output that is based on input signal 402, but with the application of a noise reduction function. This noise-reduced signal is the input to Module B 404*b*. The analysis function 406*b* in Module B 404*b* may now be able to determine features associated with the ASC. Once the analysis function 406*b* determines these features, the analysis function 406*b* will return information 412*b* indicating the determined features signal information unit 414. However, because Module B 404*b* is still disabled, the output of Module B 404*b* is the same as its input. In this example, in Module C 404*c* may still not be able to detect any features related to the voice enhancement function. Thus, the information 412*c* returned to signal information unit 414 may remain unchanged. Further, the output of Module C 404*c* will be substantially similar to is input (i.e. the output of Module B 404*b*).

When the signal information unit 414 receives information 412*b* indicating features associated with the ASC, the select function 416 may determine that it should enable Module B 404*b*. Thus, the select function 416 indicates to the output unit 418 to send a signal 410*b* to the selection and parameter control 408*b* in Module B 404*b*. The signal 410*b* that causes the module to switch to an enabled mode. When Module B 404*b* is enabled, Module B 404*b* will perform an ASC algorithm on the input signal it received from Module A 404*a*. Thus, in this example, after Module B 404*b* is enabled, Module B 404*b* produces an output that is based on input signal 402, but with the application of noise reduction (applied by Module A 404*a*) as well as the application of the ASC algorithm. This noise-reduced and ASC altered signal is the input to Module C 404*c*. However, because Module C 404*c* is still disabled, the output of Module C 404*c* is the same as its input. Nevertheless, because the analysis function 406*c* can now analyze a signal that has been both noise-reduced and ASC altered, analysis function 406*c* may be able to detect features related to the voice enhancement function. The features analysis function 406*c* detects will be reported by information 412*c* returned to signal information unit 414.

Similar to the previous discussion, when the signal information unit 414 receives information 412*c* indicating features associated with the voice enhancement function, the select function 416 may determine that it should enable Module C 404*c*. Thus, the select function 416 may indicate the output unit 418 to send a signal 410*c* to the selection and parameter control 408*c* in Module C 404*c* that causes the module to switch to an enabled mode. When Module C 404*c* is enabled, it will perform a voice enhancement algorithm on the input signal it received from Module B 404*b*. Thus, in this example, after Module C 404*c* is enabled, it produces an output that is based on input signal 402, but with the application of (i) a noise reduction algorithm (applied by Module A 404*a*), as well as the application of (ii) the ASC algorithm (applied by Module B 404*b*), an also (iii) the application of the voice enhancement algorithm. This noise-reduced, ASC-altered, voice-enhanced signal is the output 422 for this specific example.

The above example is one way in which the sound processor 400 operates. In other embodiments, the select function 416 disables some modules during operation. In yet further embodiments, the select function communicates revised parameters to the various modules.

Figure 5:
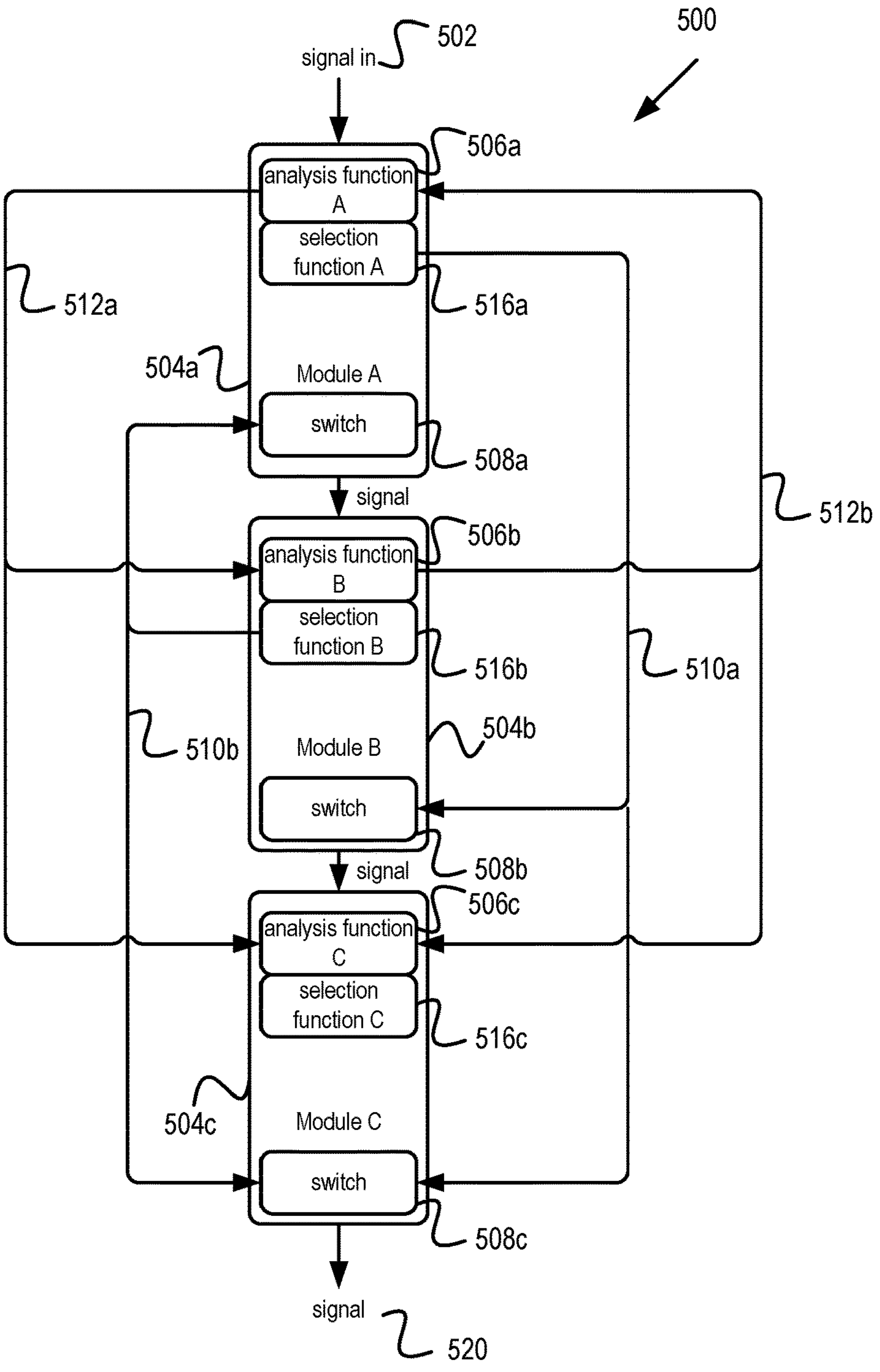
FIG. 5 is an example block diagram of a sound processor with a parallel selection and parameter control.

FIG. 5 is an example block diagram of a sound processor 500 with parallel control. The sound processor 500 receives an input 502 and transforms it into an output 520. The sound processor 500 contains a plurality of modules 504*a*-504*c*. Each module 504*a*-504*c* is configured with an analysis function 506*a*-506*c*, a selection function 516*a*-516*c*, and a switch 508*a*-508*c*. Further, each module 504*a*-504*c* is configured with its own specific sound processing function (not shown). For example, one module may be a wind-noise reduction module, another module may be an automatic sensitivity control (ASC) module, etc. Additionally, the various modules of FIG. 5 may perform functions similar to those of the first and second classifiers 304 and 312, selection and parameter control 306 (and 314) and either preprocessing 308 or post-processing 316 (of FIG. 3).

Overall, sound processor 500 behaves in a similar fashion to sound processor 400 with the exception that sound processor 500 has selection functions incorporated into the modules 504*a*-504*c* rather than one centralized selection function module 416 (of FIG. 4). However, each selection function 516*a*-516*c* may function similarly to the section function 416 of FIG. 4. Each selection function 516*a*-516*c* determines a state, either enabled or disabled, for each module 504*a*-504*c* in the signal path. As shown in FIG. 5, only modules A and B are currently outputting control signals. FIG. 5 will be used to reference one mode of operation of the methods and apparatuses described herein. The control signals may be connect from and to the modules on other configurations not explicitly shown in the figures. Further, more or fewer modules may be used as well.

The analysis function 506a-506c of each respective module 504a-504c provides a respective signal 512a-512b to the analysis function 506a-506c of each other module 504a-504c. Further, each respective module 504a-504c has a selection function 516a-516c configured to provide a respective signal 510a-510b to the switch 508a-508c of each other module 504a-504c. Additionally, each selection function 516a-516c provides a signal (not shown) with the respective switch 508a-508c of the same module. In one embodiment, the signal 510a-510b to each of the switches 508a-508c is an indication for the switch to toggle states to either enabled or disabled. In another embodiment, the signal 510a-510b to each of the switches 508a-508c is both a toggle as well as a parameter control for the respective module. In different embodiments, some blocks are combined, added, or omitted. For example, sound processor 500 is shown with three modules 504a-504c; however, in some embodiments more or fewer modules may be used. Additionally, not every module may contain both an analysis function as well as a switch. The block diagram shown in FIG. 5 is one example layout.

Sound processor 500 shows a single analysis function 506a-506c per signal processing module 504a-504c. The analysis functions 506a-506c can include any of the steps as described with respect to FIG. 3 or FIG. 4, such as feature extraction, classification and classification post-processing. Each module 504a-504c of the signal path has the ability to determine based on any of the module's inputs, outputs, or analyses, or the inputs, outputs and analyses of any other module on the signal path, whether it should be enabled, disabled or have modified parameters for the given sound signal it is processing. It can also determine whether other modules 504a-504c of the signal path should be enabled or disabled or have modified parameters. In some embodiments, when the sound environment changes, each function available in the signal path is automatically evaluating whether its current state should change, based on the information available to it.

Sound processor 500 shows a distributed algorithm for the sound processor. Each module, A through to C, can be considered to contain some kind of analysis function or functions, depending on the overall purpose of the respective module. For example, in an ASC module, it is necessary to calculate the noise floor of the signal. The calculation of the noise floor can be considered to be the analysis function for the ASC module. The output of the analysis function for the example ASC module, the noise floor, can be used within the ASC module, and/or input into one or more other modules of the signal path. The other modules 504a-504c, which can also contain one or more analysis functions, can determine a new item of information required for the specific purpose of that individual module, and/or can use information passed to it from other modules 504a-504c of the signal path in its calculations. In some embodiments, one or more of modules 504a-504c does not have its own analysis function 506a-506c but relies on information gathered by other modules of the signal path to perform its function.

One potential issue that may arise with allowing each module 504a-504c to switch itself on or off or to enable or disable other modules 504a-504c is how to coordinate these communications such that the various selection functions 516a-516c of the modules 504a-504c do not counteract each other. One method is for each module 504a-504c to broadcast its status to all other modules with the signal 512a-512b. A given module then examines the status of the rest of the modules 504a-504c in the signal path and determines, based on a set of rules dependent on the state of the system, the appropriate action to take. For example, a system-wide prioritized hierarchy of actions might be defined, such as wind noise reduction being a higher priority than spectral enhancement. Should wind noise be detected in this example, any module implementing a spectral enhancement algorithm at another point in the signal path can monitor this information, and wait for the wind noise to be reduced, before enabling their function.

Figure 6:
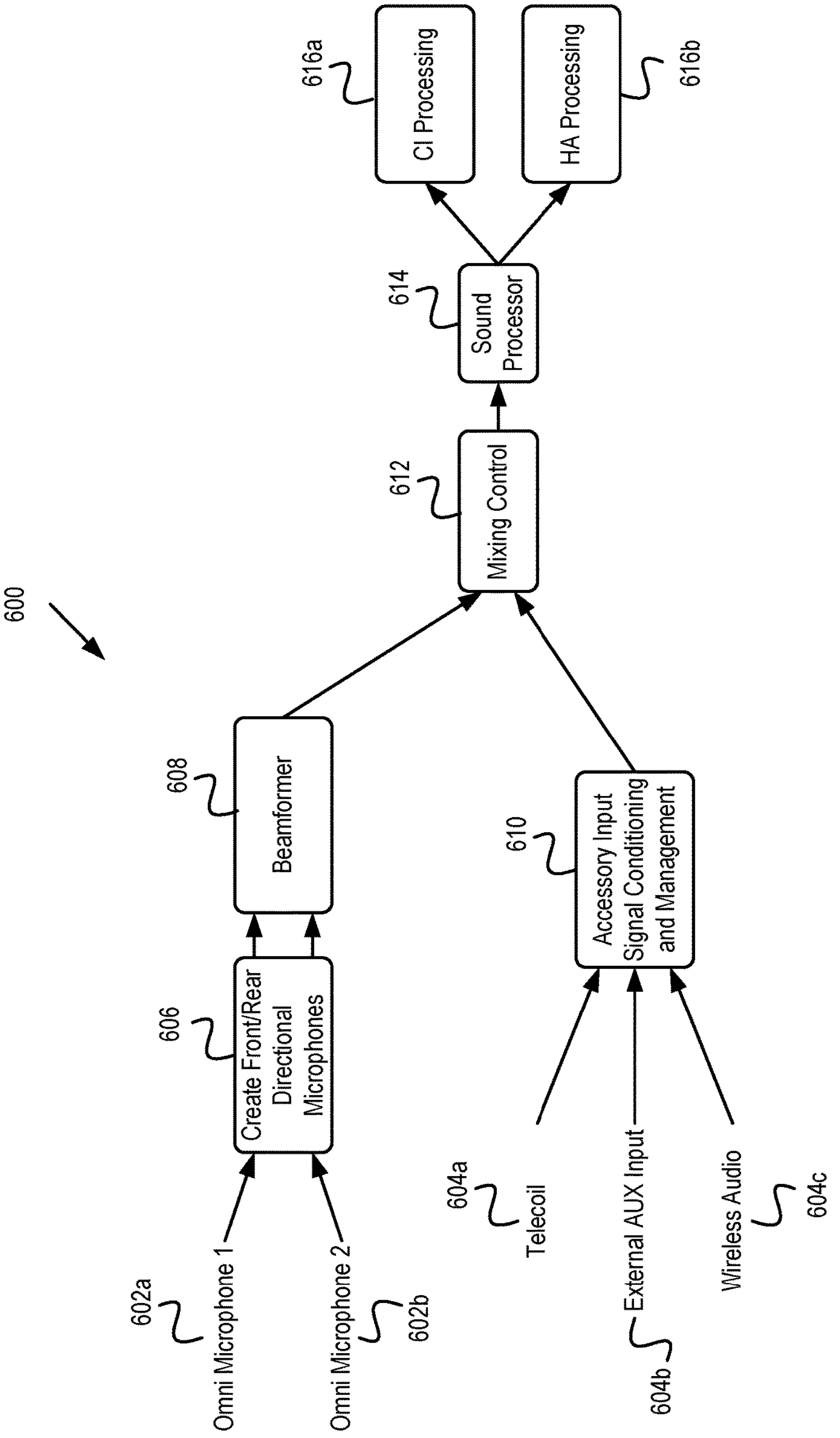
FIG. 6 is an example block diagram of an example hearing prosthesis with multiple signal paths.

FIG. 6 is an example block diagram of an example hearing prosthesis 600 with multiple signal paths. The functional aspects of FIGS. 3, 4, and 5 may be applied to the configuration shown in FIG. 6. Additionally, method 700 of FIG. 7 may also be performed on a device with multiple signal paths like the one shown in FIG. 6. Further, the configuration shown in FIG. 6 is one example of a hearing prosthesis with multiple signal paths; blocks may be added, subtracted, or moved and still function within the scope of this disclosure. Moreover, each block of FIG. 6 may function in a similar manner to the Modules disclosed with respect to FIGS. 4 and 5.

The example hearing prosthesis 600 includes two omnidirectional microphone inputs 602a and 602b. The microphone inputs 602a and 602b will capture sound for processing by the hearing prosthesis. The output of the microphone inputs 602a and 602b will be passed to block 606 where the signals from microphone inputs 602a and 602b are analyzed to determine a front directional signal and a rear directional signal. In some additional embodiments, block 606 may determine a desired signal and a noise signal. Once block 606 determines some characteristics of the signals from microphone inputs 602a and 602b, the two signals from block 606 are passed to a beamformer 608. The beamformer may post process the signals from block 606 to determine a single signal for further processing in the hearing prosthesis. In some embodiments beamformer 608 may apply a weighting factor to each signal to create a virtual beam to produce a desired signal. In other embodiments, beamformer 608 may attempt to remove the noise signal from the desired signal.

Additionally, the example hearing prosthesis 600 includes a telecoil 604a, an external auxiliary (AUX) input 604b, and a wireless audio input 604c as further inputs. The three inputs 604a-604c all provide a signal to an accessory input signal conditioning and management block 610. Accessory input signal conditioning and management block 610 monitors the signals provided from the various inputs to determine which (or if) any of the inputs are providing a desirable signal. For example, if none of the three inputs 604a-604c are providing any signals, then accessory input signal conditioning and management block 610 will not provide a signal to the rest of the signal pathway. However, sometimes more than one of the three inputs 604a-604c may be providing a signal then accessory input signal conditioning and management block 610 must determine which signal to pass to the rest of the signal pathway. In some embodiments, there may be an external control switch to select an input for accessory input signal conditioning and management block 610. In other embodiments, accessory input signal conditioning and management block 610 may select a signal based on the quality of the received signals. Further, a processor in the hearing prosthesis may select a signal based on other criteria. Additionally, accessory input signal conditioning and management block 610 may also convert signals to an appropriate signal to pass to the rest of the signal pathway.

The mixing control 612 is configured to receive signals from both the beamformer 608 and the accessory input signal conditioning and management block 610. In some embodiments, mixing control 612 will select either the signal from the beamformer 608 or the signal from accessory input signal conditioning and management block 610. However, in other embodiments, the mixing control will combine the two signals with some ratio to pass down the signal path. Mixing control 612 may either have an external control (i.e. a user may be able to switch the path) or it may have a dynamic software control. When mixing control 612 has a dynamic software control, a processor in the hearing prosthesis may select how signals are passed. For example, the processor may have mixing control 612 only pass the signal from the telecoil until either of the two omnidirectional microphone inputs 602*a* and 602*b* receive a loud sound.

The output from the mixing control 612, is fed to sound processor 614. Sound processor 614 may be similar to the other various sound processors disclosed herein. The sound processor 614 may perform various signal processing functions on the audio signal from mixing control 612. For example, the sound processor 614 may perform signal processing specific to a prosthesis recipient. The signal processing may be related to a hearing impairment of the prosthesis recipient. Additionally, the sound processor 614 may perform other signal processing functions, such as noise reduction and/or altering amplitudes of frequency components of the audio signal. Further, the sound processor 614 may output a signal via one of two outputs, cochlear implant (CI) processing 616*a* or hearing aid (HA) processing 616*b*. Sound processor 614 may either have an external control (i.e. a user may be able to switch the output) or it may have a dynamic software control. When sound processor 614 has a dynamic software control, the processor itself may select how signals are output.

The blocks for both cochlear implant (CI) processing 616*a* or hearing aid (HA) processing 616*b* provide further sound processing specific to the type of hearing prosthesis. In some embodiments, the sound processor may be able to function in a CI or HA system, thus both signal processing pathways may be present. Both CI processing 616*a* and HA processing 616*b* ultimately produce a signal that will provide a stimulation to a prosthesis recipient.

The example hearing prosthesis 600 may include environmental classification, as disclosed with respect to FIGS. 3, 4, and 5, at each point in the signal pathway that has an arrow in FIG. 6. Based on a determined classification, information about the audio signal can be relayed to various modules throughout hearing prosthesis 600 based on the classification determined at different points in the signal pathway.

In one example embodiment, the hearing prosthesis may provide simultaneous environmental classifications of the front and rear facing microphone signals, created at the output of module 606. If the front facing microphone signal is classified as speech, while the rear facing microphone is classed as being noise, this information can be provided to the beamformer to instruct it to reduce noise from the rear direction only. Alternatively, if the front facing microphone signal is classified as noise, while the rear facing microphone is classed as being speech, this information can be provided to the beamformer to instruct it to reduce noise from the front direction only. Other implementations are possible as well.

In another example embodiment, the hearing prosthesis may provide simultaneous environmental classifications of all accessory inputs, and provide this information to module 610, where priorities might be assigned to those inputs with speech, over inputs providing noise and/or music.

In another example embodiment, the hearing prosthesis may receive a desired audio input signal through the telecoil input 604*a*. This desired input may be used to ultimately provide a stimulation to the prosthesis recipient. However, during operation in telecoil mode, the prosthesis may receive an audio signal via omnidirectional microphone 1 602*a* that indicates a fire alarm. An environmental classifier may recognize the high sound level and classification of the fire alarm and responsively transmit a signal to mixer control 612. The mixer control 612 may responsively modify the mixing level.

By modifying the mixing level, a prosthesis recipient, who is operating the prosthesis in a telecoil mode would be able to hear the fire alarm as well. This is because in a typical telecoil mode, the microphone may be completely muted. Once the mixing is adjusted, a portion of the microphone signal may be combined with the telecoil signal. This combined signal would then ultimately be applied to the prosthesis recipient. Further, once the mixer has been adjusted, an environmental classifier located after the mixing control 612 may classify the signal as having noise which is too loud on a specific frequency band. The classifier may provide this information to sound processor 614 which may responsively adjust a gain table. This example is just one example of how the disclosed methods and apparatuses may be used in a hearing prosthesis with multiple signal pathways. Any combination of classification and modifications to system parameters may be used with the hearing prosthesis 600.

Figure 7:
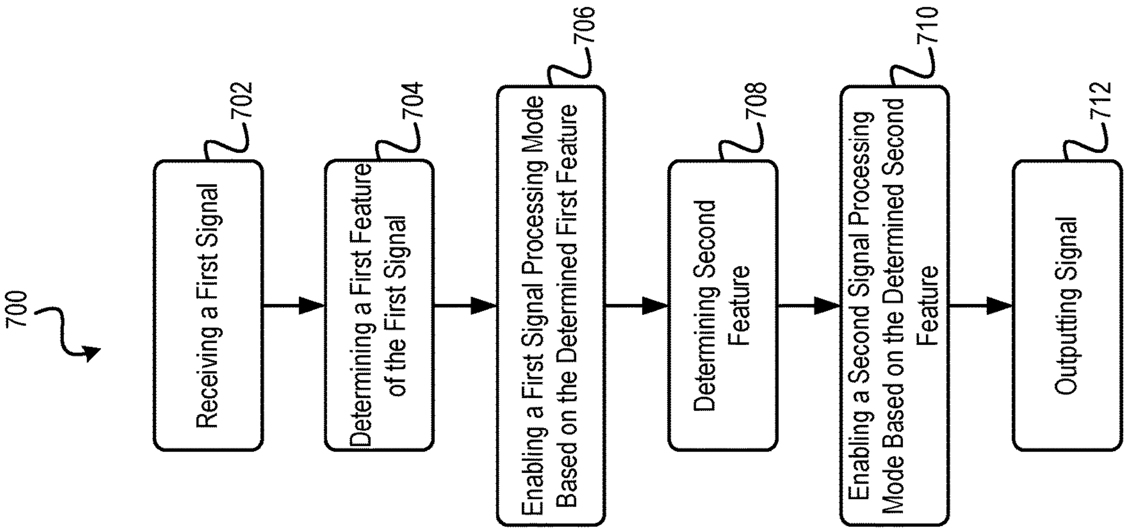
FIG. 7 is an example flowchart of a method for a sound processor.

FIG. 7 is one example method 700 for a sound processor. As part of method 700, the sound processor 104 receives an audio signal at block 702 and transforms it into an output signal at block 712. Method 700 is one example layout for an example method. In different embodiments, some blocks are combined, added, or omitted. Additionally, some blocks may be performed in parallel or in sequence. Further, method 700 may be performed by a processor located within the hearing prosthesis.

The method 700 distributes some sensing and control functions throughout the signal path. Once a signal is received by the sound processor 104 at block 702, the signal is analyzed more than once to determine what signal processing functions should be enabled. More specifically, at block 704 the sound processor 104 analyzes the audio signal to determine a first feature of the signal. Further, at block 704 the sound processor 104 detects features from the first audio signal (for example amplitude modulation, spectral spread). Upon detecting features, the sound processor 104 responsively uses these features to classify the sound environment (for example into speech, noise, music). The sound processor 104 makes a classification of the type of signal present based on features of the signal.

At block 706, the sound processor 104 in the hearing prosthesis 101 enables a sound processing mode based on the features of the audio signal determined at block 704. In some embodiments, the processor in the hearing prosthesis also uses the sound environment to determine which signal processing mode to enable. Further, the sound processor also controls parameters associated with the processing mode. For example, if the determined feature is noise, the processor may decide that the noise-reduction mode should be enabled, and/or the gain of the system should be reduced appropriately. Further, upon the processor determining a sound processing mode, the determined sound processing mode is applied to the first signal creating a transformed signal.

At step 708 the sound processor detects features from the transformed audio signal. Upon detecting features, the sound processor responsively uses these features to classify the sound environment (for example into speech, noise, music) based on the transformed signal. In some embodiments, features are detected in the transformed signal that were not detected in the first signal. For example, a voice signal may be detected in the transformed signal although it was masked by noise when the first signal was analyzed.

At step 710, the processor in the hearing prosthesis enables a second sound processing mode based on the determined features of the transformed signal. In some embodiments, the processor in the hearing prosthesis also uses a sound environment associated with the features detected in the second signal to determine which signal processing mode to enable for the second signal processing mode. Further, the sound processor also controls parameters associated with the second processing mode. For example, if the determined feature is a voice, the processor may decide that the voice enhancement mode should be enabled, and/or the gain of the system should be increased appropriately.

Further, upon the processor determining a sound processing mode, the determined sound processing mode is applied to the transformed signal by the processor creating an output signal. In some embodiments, steps 708 and 710 are repeated to further identify features. Many signal processing modes are enabled sequentially (or simultaneously) with the methods disclosed herein. In yet another embodiment, signal processing modes are disabled based on determined features of the various signals.

At step 712, the output signal is output from the sound processor. In some embodiments, the output signal is transformed into a stimulus to apply to a prosthesis recipient. However, in other embodiments, it is further processed by the hearing prosthesis.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method, comprising:

performing a first type of classification analysis to determine a first environmental classification of a first signal at a first location in a signal processing path of a device;

selecting, based on the first environmental classification, a first processing mode;

converting, in accordance with the first processing mode, the first signal into a second signal;

performing a second type of classification analysis that is different from the first type of classification analysis to determine a second environmental classification, different from the first environmental classification, of the second signal at a second location in the signal processing path, the second signal being previously converted from the first signal in accordance with the first processing mode;

selecting, based on the second environmental classification, a second processing mode;

converting, in accordance with the second processing mode, the second signal into a third signal; and generating stimulating signals for delivery to a recipient of the device based on the third signal.

2. The method of claim 1, wherein selecting the first processing mode comprises:

selecting a noise reduction mode.

3. The method of claim 1, wherein selecting the first processing mode comprises:

selecting a wind-noise reduction mode.

4. The method of claim 1, wherein selecting the second processing mode comprises:

selecting a voice enhancement mode.

5. The method of claim 1, wherein selecting the second processing mode comprises:

selecting an output compression mode.

6. The method of claim 1, wherein the second environmental classification is determined after the first processing mode is enabled.

7. The method of claim 1, further comprising:

receiving one or more sound signals at the device; and generating the first signal from the one or more sound signals.

8. The method of claim 1, wherein the first signal represents one or more audio signals, and wherein performing the first type of classification analysis to determine the first environmental classification of the first signal comprises:

extracting, from the first signal, one or more features of the one or more audio signals; and determining the first environmental classification based on the one or more features extracted from the first signal.

9. The method of claim 8, wherein extracting the one or more features of the one or more audio signals comprises:

extracting one or more of a signal level, a signal modulation depth, a signal rhythmicity, a signal spectral spread, or signal frequency components of the one or more audio signals.

10. The method of claim 1, wherein:

performing the first type of classification analysis includes performing a noise classification analysis;

selecting the first processing mode includes selecting a noise reduction mode;

converting the first signal into the second signal includes reducing noise in the first signal; and performing the second type of classification analysis includes performing a voice classification analysis on the second signal that includes reduced noise.

11. The method of claim 1, wherein performing the first type of classification analysis to determine the first environmental classification of the first signal comprises selecting the first environmental classification from a first plurality of environmental classifications, wherein performing the second type of classification analysis to determine the second environmental classification of the second signal comprises selecting the second environmental classification from a second plurality of environmental classifications, and wherein the first plurality of environmental classifications and the second plurality of environmental classifications are different from one another.

12. The method of claim 1, wherein the first type of classification analysis comprises an environmental analysis, and wherein the second type of classification analysis comprises a voice analysis, different from the environmental analysis.

13. One or more non-transitory computer readable storage media operable with a hearing device, wherein the storage media comprises instructions that, when executed by at least one processor, are operable to:

perform a first type of classification analysis to classify a sound environment of an input signal received at the hearing device as a first sound environment;

enable, based on the classification of the sound environment of the input signal as the first sound environment, a first processing mode;

transform the input signal into a first transformed signal using the first processing mode;

perform a second type of classification analysis to classify a sound environment of the first transformed signal as a second sound environment, different from the first sound environment;

enable, based on the classification of the sound environment of the first transformed signal as the second sound environment, a second processing mode;

transform the first transformed signal previously transformed from the input signal into a second transformed signal using the second processing mode; and provide the second transformed signal to the hearing device, wherein the hearing device generates stimulating signals based on the second transformed signal for delivery to a recipient of the hearing device.

14. The one or more non-transitory computer readable storage media of claim 13, further comprising instructions operable to:

receive a plurality of signals representing audio signals; and generate the input signal from the plurality of signals.

15. The one or more non-transitory computer readable storage media of claim 14, wherein the first processing mode is a mixing ratio of the plurality of signals.

16. The one or more non-transitory computer readable storage media of claim 13, wherein the input signal represents one or more audio signals, and wherein the instructions operable to perform the first type of classification analysis to classify the sound environment of the input signal comprise instructions operable to:

extract, from the input signal, one or more features of the one or more audio signals; and determine the classification of the sound environment of the input signal as the first sound environment based on the one or more features extracted from the input signal.

17. The one or more non-transitory computer readable storage media of claim 16, wherein the instructions operable to extract the one or more features from the input signal comprise instructions operable to:

extract one or more of a signal level, a signal modulation depth, a signal rhythmicity, a signal spectral spread, or signal frequency components of the one or more audio signals.

18. The one or more non-transitory computer readable storage media of claim 13, wherein the instructions operable to enable the first processing mode or the second processing mode comprise instructions operable to:

enable a noise reduction mode.

19. The one or more non-transitory computer readable storage media of claim 13, wherein the instructions operable to enable the first processing mode or the second processing mode comprise instructions operable to:

enable a wind-noise reduction mode.

20. The one or more non-transitory computer readable storage media of claim 13, wherein the instructions operable to enable the second processing mode or the second processing mode comprise instructions operable to:

enable a voice enhancement mode.

* * * * *